US012274651B2

(12) United States Patent
Nishikawa et al.

(10) Patent No.: US 12,274,651 B2
(45) Date of Patent: Apr. 15, 2025

(54) WHEELCHAIR RESTRAINT APPARATUS

(71) Applicant: TOYOTA BOSHOKU KABUSHIKI KAISHA, Aichi (JP)

(72) Inventors: Tokuyuki Nishikawa, Aichi (JP); Keisuke Toda, Aichi (JP); Katsuhito Yamauchi, Aichi (JP); Jacob Richter, Livonia, MI (US); Chandra Jinka, South Lyon, MI (US); Doug Krueger, Macomb Township, MI (US); Tracy Joseph, Clinton Township, MI (US); Enoch Morishima, Sunnyvale, CA (US)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 750 days.

(21) Appl. No.: 17/545,732

(22) Filed: Dec. 8, 2021

(65) Prior Publication Data

US 2023/0172776 A1 Jun. 8, 2023

(51) Int. Cl.
*A61G 3/00* (2006.01)
*A61G 3/08* (2006.01)

(52) U.S. Cl.
CPC .................................. *A61G 3/0808* (2013.01)

(58) Field of Classification Search
CPC ................................ A61G 3/08; A61G 3/0808
See application file for complete search history.

(56) References Cited

U.S. PATENT DOCUMENTS

| | | | | |
|---|---|---|---|---|
| 2006/0250011 | A1 | 11/2006 | Sawdy | |
| 2013/0088060 | A1 | 4/2013 | de Bijl et al. | |
| 2020/0039626 | A1* | 2/2020 | Johnson | B64D 11/062 |
| 2020/0093662 | A1* | 3/2020 | Mori | B60N 2/3047 |
| 2020/0172225 | A1* | 6/2020 | Johnson | B64D 11/00 |
| 2021/0053585 | A1 | 2/2021 | Ohno et al. | |
| 2024/0051439 | A1* | 2/2024 | Priestman | B60N 2/3045 |

FOREIGN PATENT DOCUMENTS

| | | |
|---|---|---|
| EP | 1 777 100 | 3/2011 |
| GB | 2 176 154 | 12/1986 |
| GB | 2 197 628 | 5/1988 |
| JP | 2021-30877 | 3/2021 |

OTHER PUBLICATIONS

Extended European Search Report issued in European patent application No. 22208310.7, dated May 22, 2023.

* cited by examiner

*Primary Examiner* — Steven O Douglas
(74) *Attorney, Agent, or Firm* — GREENBLUM & BERNSTEIN, P.L.C.

(57) ABSTRACT

The present disclosure provides a wheelchair restraint apparatus that renders easy adjustment of a restraining position of a wheelchair inside a vehicle. One aspect of the present disclosure is a wheelchair restraint apparatus configured to restrain a wheelchair inside a vehicle. The wheelchair restraint apparatus includes a main body having a seat belt, and a restrained mechanism to and from which the wheelchair is attachable and detachable; and a slide mechanism configured to cause the main body to slide with respect to the vehicle. The restraint mechanism is configured to restrain the wheelchair in a state where a part of the wheelchair is inserted to the restraint mechanism in a traveling direction of the wheelchair.

3 Claims, 6 Drawing Sheets

WHEELCHAIR RESTRAINT APPARATUS

BACKGROUND

The present disclosure relates to a wheelchair restraint apparatus.

A system that provides an occupant of a wheelchair, restrained inside a vehicle such as a passenger car and the like, with a seat belt used in the vehicle is known (see Japanese Unexamined Patent Application Publication No. 2021-030877).

SUMMARY

To make a seat belt installed in a vehicle available also for a wheelchair, it is necessary to precisely adjust a restraining position of the wheelchair (particularly, alignment in width directions of the wheelchair). Depending on the restraining position, a space for handling the wheelchair may be too small to place the wheelchair in position without any problems.

In one aspect of the present disclosure, it is preferable to provide a wheelchair restraint apparatus that renders easy adjustment of the restraining position of a wheelchair inside a vehicle.

One aspect of the present disclosure is a wheelchair restraint apparatus configured to restrain a wheelchair inside a vehicle. The wheelchair restraint apparatus includes a main body having a seat belt, and a restraint mechanism to and from which the wheelchair is attachable and detachable; and a slide mechanism configured to cause the main body to slide with respect to the vehicle. The restraint mechanism is configured to restrain the wheelchair in a state where a part of the wheelchair is inserted to the restraint mechanism in a traveling direction of the wheelchair.

Such configuration enables positioning of the wheelchair with the main body of the wheelchair restraint apparatus by inserting a part of the wheelchair to the restraint mechanism in the traveling direction of the wheelchair. In addition, because the main body to which the wheelchair is restrained is made slideable, the wheelchair can be restrained after the main body has been moved to a position where the wheelchair can be easily handled. Owing to the above, the adjustment of the restraining position of the wheelchair in the vehicle is facilitated, and an occupant of the wheelchair can appropriately use the seat belt disposed in the main body.

In one aspect of the present disclosure, the wheelchair restraint mechanism may further include a rotation mechanism configured to cause the main body to rotate with respect to the vehicle. Such configuration enables adjustment of an insertion direction of the wheelchair to the main body. This consequently further facilitates the adjustment of the restraining position of the wheelchair in the vehicle.

In one aspect of the present disclosure, the main body may be a vehicle seat. Such configuration enables a use of the seat belt disposed in the vehicle seat for the wheelchair. Consequently, it eliminates the necessity of providing the vehicle with a dedicated seat belt for wheelchairs.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
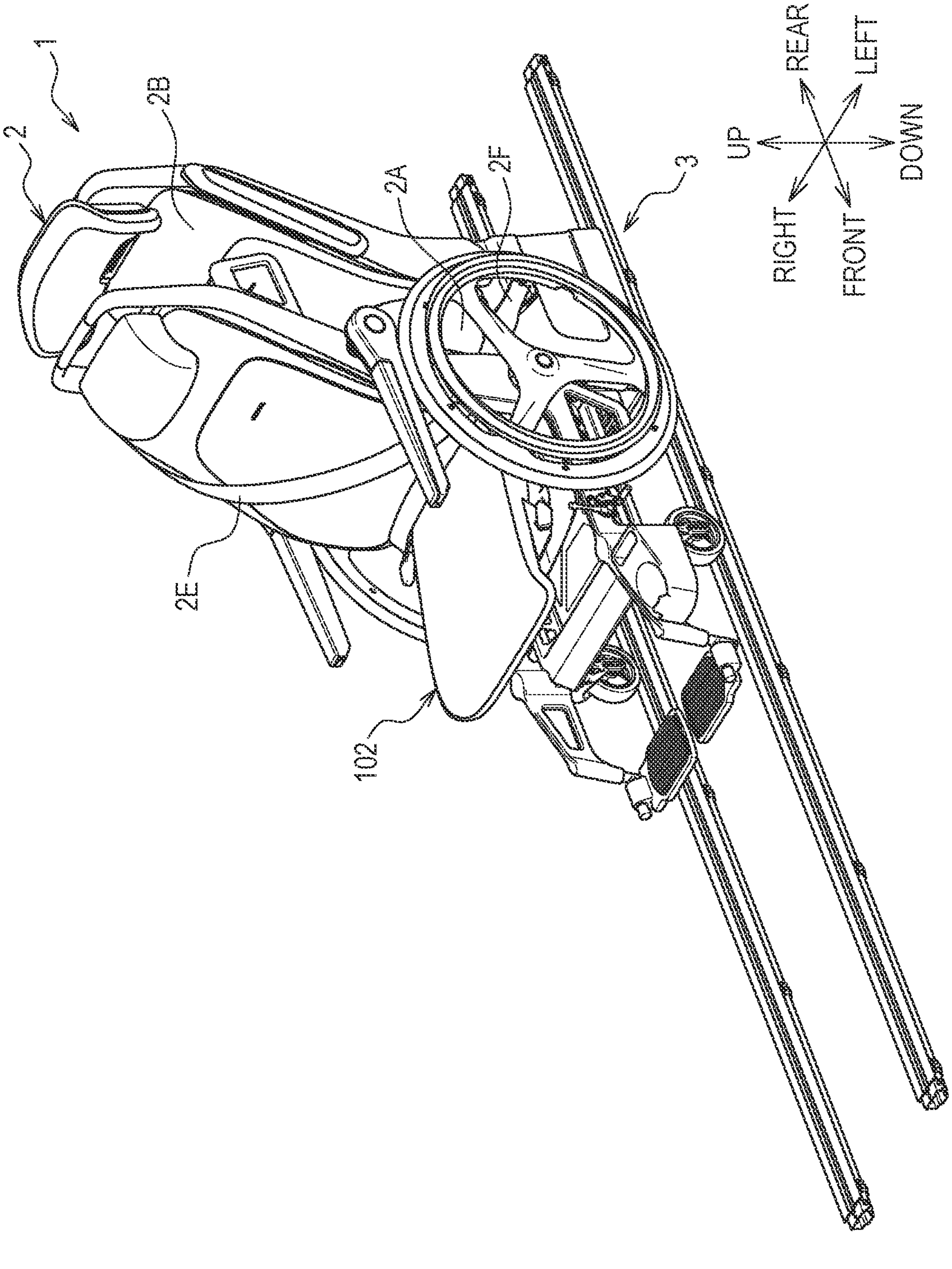
FIG. 1 is a schematic perspective view of a wheelchair restraint apparatus of an embodiment.

A wheelchair restraint apparatus 1 shown in FIG. 1 is an apparatus for restraining a wheelchair 102 in a vehicle. The wheelchair restraint apparatus 1 includes a vehicle seat 2, and a slide mechanism 3.

Examples of the vehicle in which the wheelchair restraint apparatus 1 is installed may include, automobiles, railroad vehicles, ships, boats, and aircrafts. Directions defined in the description hereafter and in the accompanying drawings correspond to directions from the vehicle seat 2. Front-rear directions, width directions, and up-down directions from the wheelchair 102 restrained to the vehicle seat 2 respectively correspond to front-rear directions, width directions, and up-down directions from the vehicle seat 2.

<Vehicle Seat>

The vehicle seat 2 is used as a seating in the vehicle and also serves as the main body to restrain the wheelchair 102 in the wheelchair restraint apparatus 1.

Figure 2:
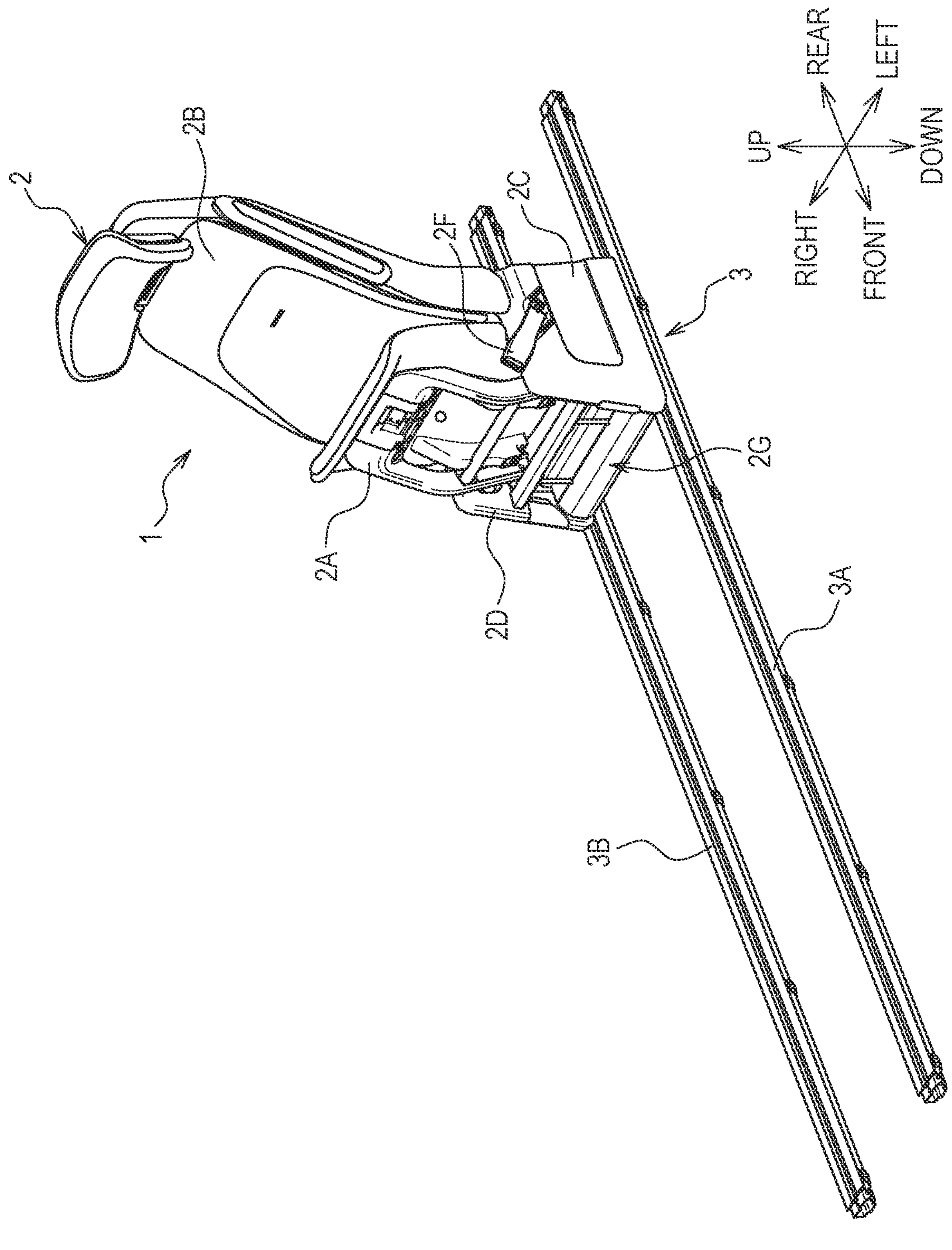
FIG. 2 is a schematic perspective view of a vehicle seat of the wheelchair restraint apparatus in FIG. 1.

As shown in FIG. 2, the vehicle seat 2 includes a seat cushion 2A, a seatback 2B, a first leg 2C, a second leg 2D, a seat belt 2E (see FIG. 1), a belt buckle 2F, and a restraint mechanism 2G.

The seat cushion 2A is a part that supports the buttocks of an occupant of the vehicle seat 2. The seatback 2B is a part that supports the back of the occupant of the vehicle seat 2. As shown in FIG. 2, the seat cushion 2A is flipped up when the wheelchair 102 is restrained. In other words, the seat cushion 2A is configured to pivotally move between its seating position and flipped position.

The first leg 2C and the second leg 2D support the seat cushion 2A and the seatback 2B. The first leg 2C and the second leg 2D are arranged apart from each other in the width directions. The first leg 2C is disposed on the left side of the second leg 2D. The first leg 2C and the second leg 2D are attached to the slide mechanism 3.

The seat belt 2E shown in FIG. 1 is retained by the seatback 2B. The seat belt 2E has a (latch) plate, which can be fastened to and detached from the belt buckle 2F, disposed on an outer side of the seat cushion 2A in the width directions.

The seat belt 2E extends from one shoulder portion of the seatback 2B to the belt buckle 2F to be worn by the occupant of the vehicle seat 2. In a state where the wheelchair 102 is restrained to the vehicle seat 2, the seat belt 2E can also be worn by an occupant of the wheelchair 102.

The restraint mechanism 2G is a part to and from which the wheelchair 102 can be attached and detached. The restraint mechanism 2G is configured to restrain the wheelchair 2 in a state where a part of the wheelchair 102 (that is, an insertion portion 102D) is inserted to the restraint mechanism in a traveling direction of the wheelchair 102 (more specifically, in a direction towards which the wheelchair 102 moves in reverse).

Figure 3:
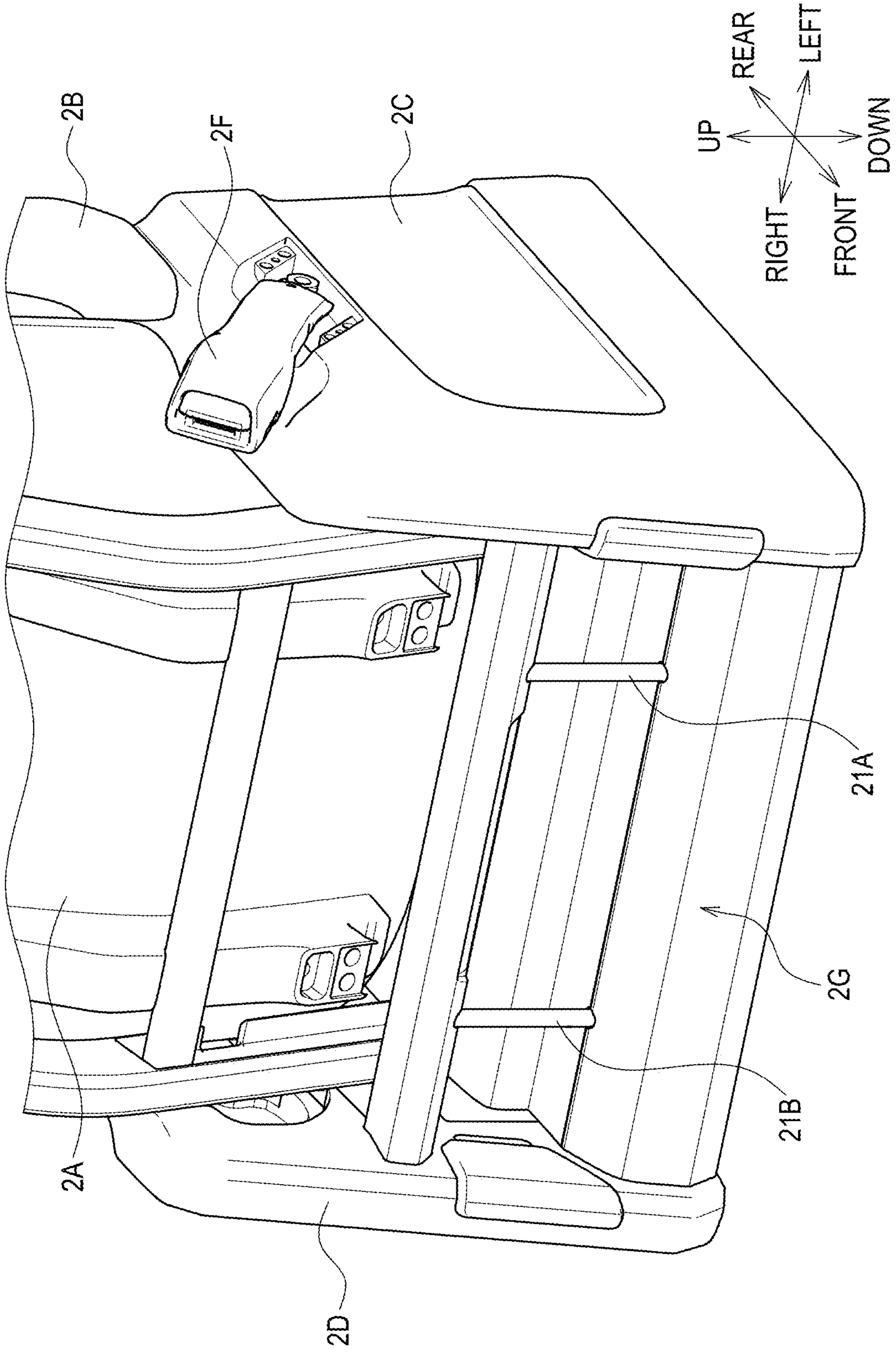
FIG. 3 is a schematic perspective view of an engagement target portion of the vehicle seat in FIG. 2.

As shown in FIG. 3, the restraint mechanism 2G is disposed below the seat cushion 2A and the seatback 2B of the vehicle seat 2. The restraint mechanism 2G includes a first striker 21A, and a second striker 21B.

Each of the first striker 21A and the second striker 21B is a rod-like member that extends in the up-down directions. The first striker 21A and the second striker 21B are arranged apart from each other in the width directions of the wheelchair 102 restrained to the vehicle seat 2 (that is, in the width directions of the vehicle seat 2).

The first striker 21A is disposed on the right side of the second striker 21B. The first striker 21A and the second striker 21B are arranged to align with each other in the width directions of the vehicle seat 2. In other words, the first striker 21A and the second striker 21B have the same front-rear-direction alignment on the vehicle seat 2.

In addition, the first striker 21A and the second striker 21B are disposed between the first leg 2C and the second leg 2D in the width directions of the vehicle seat 2. The distance between the first leg 2C and the first striker 21A is the same as the distance between the second leg 2D and the second striker 21B.

<Slide Mechanism>

The slide mechanism 3 is configured to cause the vehicle seat 2 to slide with respect to the vehicle. The slide mechanism 3 is disposed on a floor surface of the vehicle.

More specifically, the slide mechanism 3 is configured to cause the vehicle seat 2 to slide in the front-rear directions. The slide mechanism 3 includes a first rail 3A, and a second rail 3B, arranged apart from each other in the width directions of the vehicle seat 2. The first leg 2C is retained by the first rail 3A in a slideable manner. The second leg 2D is retained by the second rail 3B in a slideable manner.

In both an occupied state (that is, a state where a person is seated in the vehicle seat 2) and a state where the wheelchair 102 is restrained, the vehicle seat 2 is slidable in the front-rear directions along the first rail 3A and the second rail 3B. Directions of extension of the first rail 3A and the second rail 3B (that is, sliding directions of the vehicle seat 2) are, for example, the front-rear directions of the vehicle.

The slide mechanism 3 may be configured to cause the vehicle seat 2 to slide by using, for example, an actuator powered by electricity, air, hydraulic pressure, and the like. The slide mechanism 3 may also be configured to cause the vehicle seat 2 to slide manually.

<Wheelchair>

Figure 4:
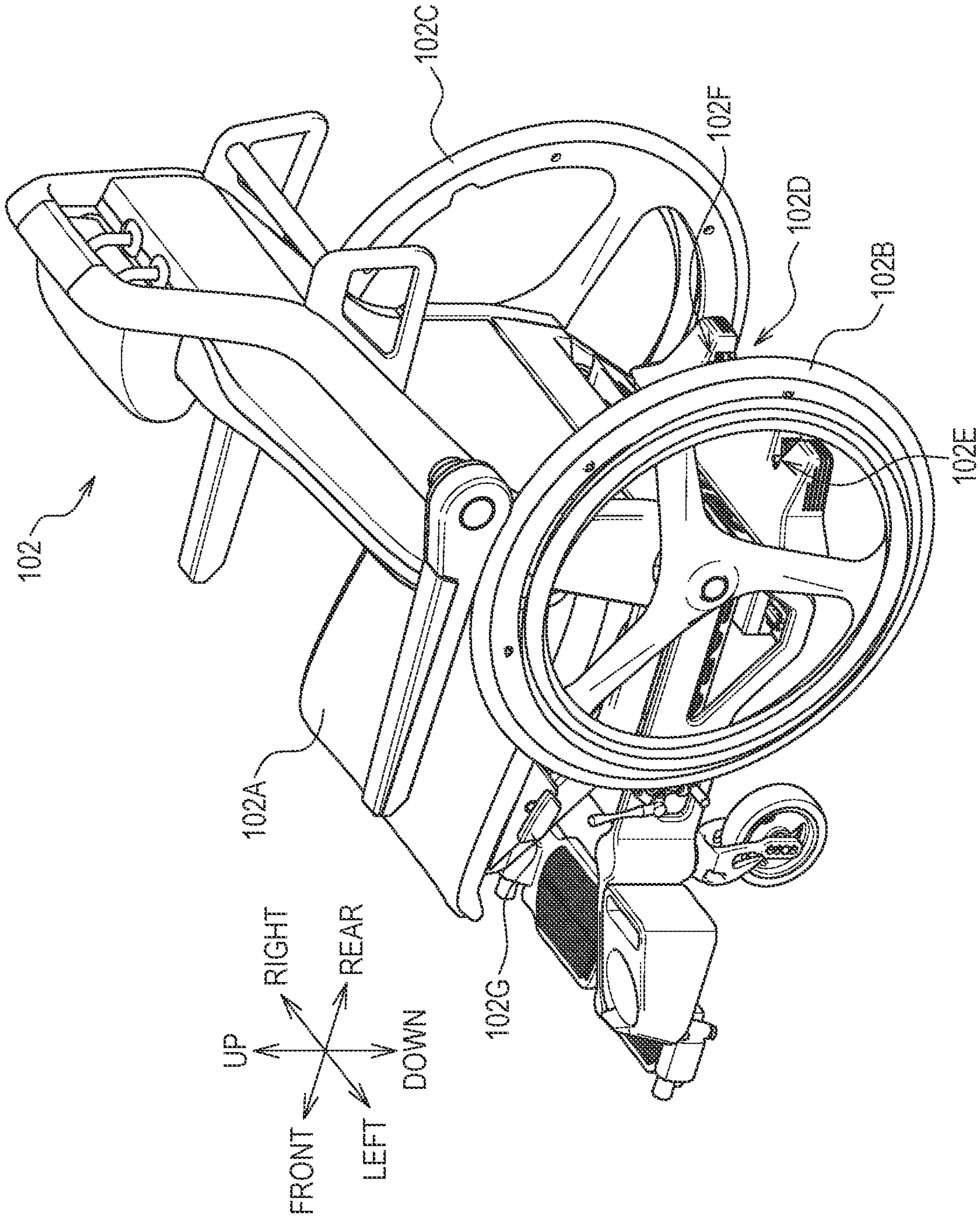
FIG. 4 is a schematic perspective view of the wheelchair of the wheelchair restraint apparatus in FIG. 1.

As shown in FIG. 4, the wheelchair 102 includes a seat 102A, a first wheel 102B, a second wheel 102C, and an insertion portion 102D.

The first wheel 102B and the second wheel 102C are each rotatably attached to the seat 102A. The first wheel 102B is situated on the left side of the second wheel 102C. The seat 102A, the first wheel 102B, and the second wheel 102C are publicly known components for wheelchairs. The wheelchair 102 is able to travel in the front-rear directions of the seat 102A.

The insertion portion 102D is a part restrained by the vehicle seat 2 with its insertion into the restraint mechanism 2G of the vehicle seat 2. The insertion portion 102D is disposed between the first wheel 102B and the second wheel 102C in the width directions of the wheelchair 102. The insertion portion 102D includes a first latch mechanism 102E, a second latch mechanism 102F, and a release lever 102G.

The first latch mechanism 102E is configured to retain the first striker 21A of the restraint mechanism 2G in a restraining space. The first latch mechanism 102E changes between a locked state, where the first latch mechanism 102E limits a rearward movement of the first striker 21A by closing the restraining space, and an unlocked state, where the first latch mechanism 102E opens the restraining space.

In the locked state, the first latch mechanism 102E changes to the unlocked state in response to an imposition of a load from the rearward. Thus, as the wheelchair 102 moves to the rear towards the vehicle seat 2, the first striker 21A collides with the front of the first latch mechanism 102E in the locked state, and the restraining space of the first latch mechanism 102E opens. Consequently, the first striker 21A is housed in the restraining space of the first latch mechanism 102E.

The first latch mechanism 102E is biased from the unlocked state to the locked state by an elastic element. Thus, when the first latch mechanism 102E is released from the load while the first striker 21A is housed in the restraining space, this biasing force causes the first latch mechanism 102E to close the restraining space. The first striker 21A is locked as a consequence.

The second latch mechanism 102F is configured to hold the second striker 21B of the restraint mechanism 2G within the restraining space. The second latch mechanism 102F is configured in the same manner as the first latch mechanism 102E. In other words, the second latch mechanism 102F changes from the locked state to the unlocked state by a collision with the second striker 21B and is also biased from the unlocked state to the locked state.

By causing the wheelchair 102 to move in reverse from a location ahead of the vehicle seat 2 towards the vehicle seat 2, the first striker 21A and the second striker 21B respectively engages with the first latch mechanism 102E and the second latch mechanism 102F. This causes the insertion portion 102D of the wheelchair 102 to be restrained by the restraint mechanism 2G.

The first latch mechanism 102E and the second latch mechanism 102F are coupled to the release lever 102G. Manipulation of the release lever 102G causes the first latch mechanism 102E and the second latch mechanism 102F to change from the locked state to the unlocked state.

When the occupant of the wheelchair 102 restrained to the vehicle seat 2 moves the wheelchair 102 forward while manipulating the release lever 102G, the wheelchair 102 is released from the vehicle seat 2. When the manipulation of the release lever 102G is stopped, the first latch mechanism 102E and the second latch mechanism 102F return to the locked state by the biasing force.

In a state where the insertion portion 102D is restrained by the restraint mechanism 2G of the vehicle seat 2, the wheelchair 102 is caused to slide by the slide mechanism 3 together with the vehicle seat 2 in the front-rear directions. This enables the vehicle seat 2 to slide to a spacious area in the vehicle to restrain the wheelchair 102 and then slide to any desired position with the wheelchair 102.

[1-2. Effect]

According to the embodiment explained above in detail, the following effects can be obtained.

(1a) By inserting a part of the wheelchair 102 (that is, the insertion portion 102D) to the restraint mechanism 2G in the traveling direction of the wheelchair 102, positioning of the wheelchair 102 with the vehicle seat 2, which is the main body of the wheelchair restraint apparatus 1, can be enabled. In addition, since the vehicle seat 2, to which the wheelchair 102 is restrained, is made slideable, the wheelchair 102 can be restrained after the vehicle seat 2 has been moved to a position where the wheelchair 102 can be easily handled. Owing to the above, the adjustment of the restraining position of the wheelchair 102 in the vehicle is facilitated, and the occupant of the wheelchair 102 can appropriately use the seat belt 2E disposed in the vehicle seat 2.

(1b) By having the vehicle seat 2 serve as the main body of the wheelchair restraint apparatus 1, the seat belt 2E disposed in the vehicle seat 2 can be used for the wheelchair 102. Consequently, it eliminates the necessity of providing the vehicle with a dedicated seat belt for wheelchairs.

2. Second Embodiment

[2-1. Configuration]

Figure 5:
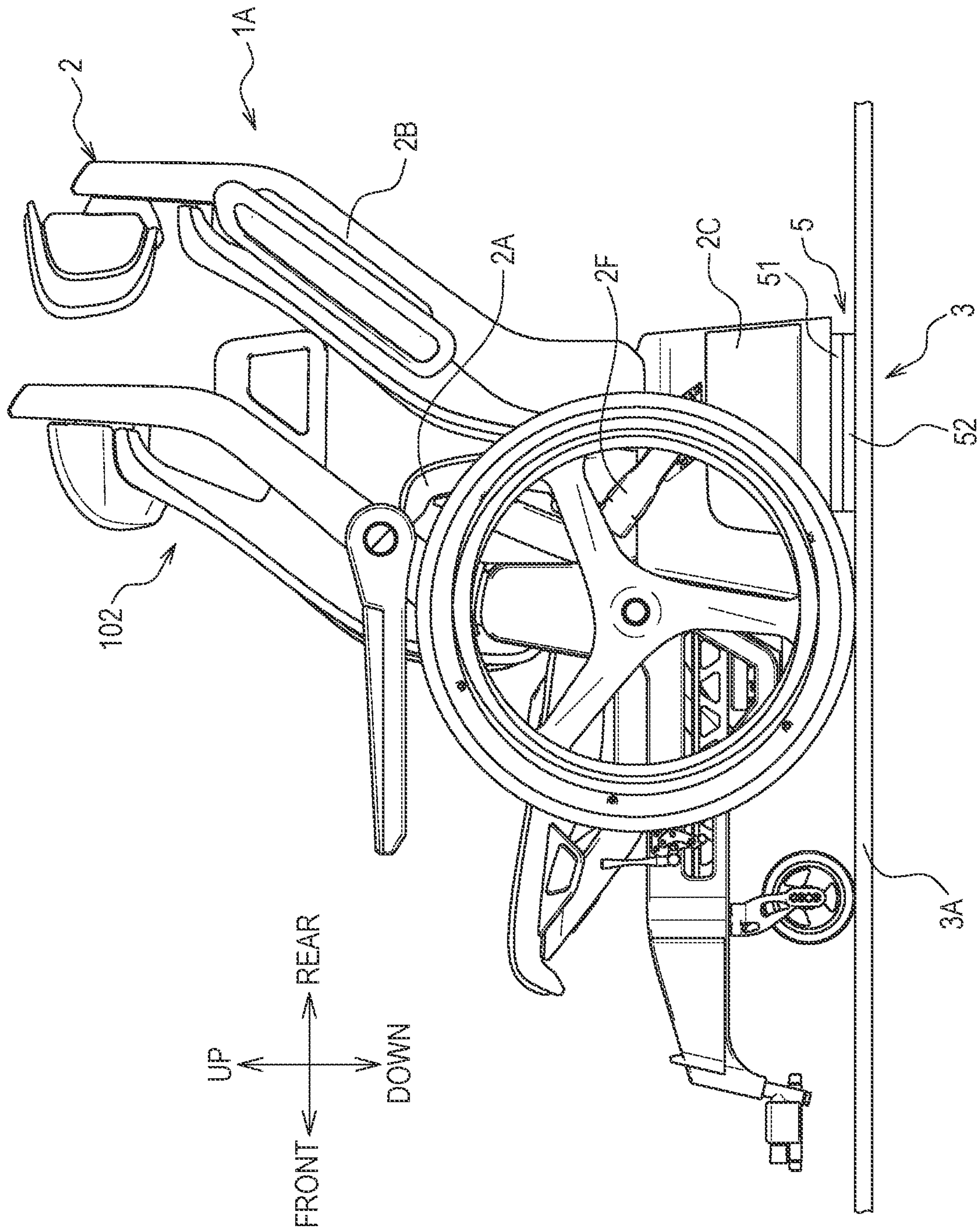
FIG. 5 is a schematic side view of a wheelchair restraint apparatus of an embodiment different from the embodiment in FIG. 1.

A wheelchair restraint apparatus 1A shown in FIG. 5 is an apparatus for restraining the wheelchair 102 in a vehicle.

The wheelchair restraint apparatus 1A includes the vehicle seat 2, the slide mechanism 3, and a rotation mechanism 5. The vehicle seat 2 and the slide mechanism 3 of the wheelchair restraint apparatus 1A are the same as those of the wheelchair restraint apparatus 1 shown in FIG. 1. In other words, the wheelchair restraint apparatus 1A is the wheelchair restraint apparatus 1 in FIG. 1 with the rotation mechanism 5.

<Rotation Mechanism>

The rotation mechanism 5 is configured to cause the vehicle seat 2 to rotate with respect to the vehicle. The rotation mechanism 5 includes an upper portion 51, and a lower portion 52.

The upper portion 51 is fixed to the vehicle seat 2 (more specifically, to the first leg 2C and the second leg 2D). The lower portion 52 is retained by the slide mechanism 3 in a slideable manner. The lower portion 52 retains the upper portion 51 such that the upper portion 51 is rotatable about a rotation shaft, which extends parallel with the up-down directions.

Figure 6:
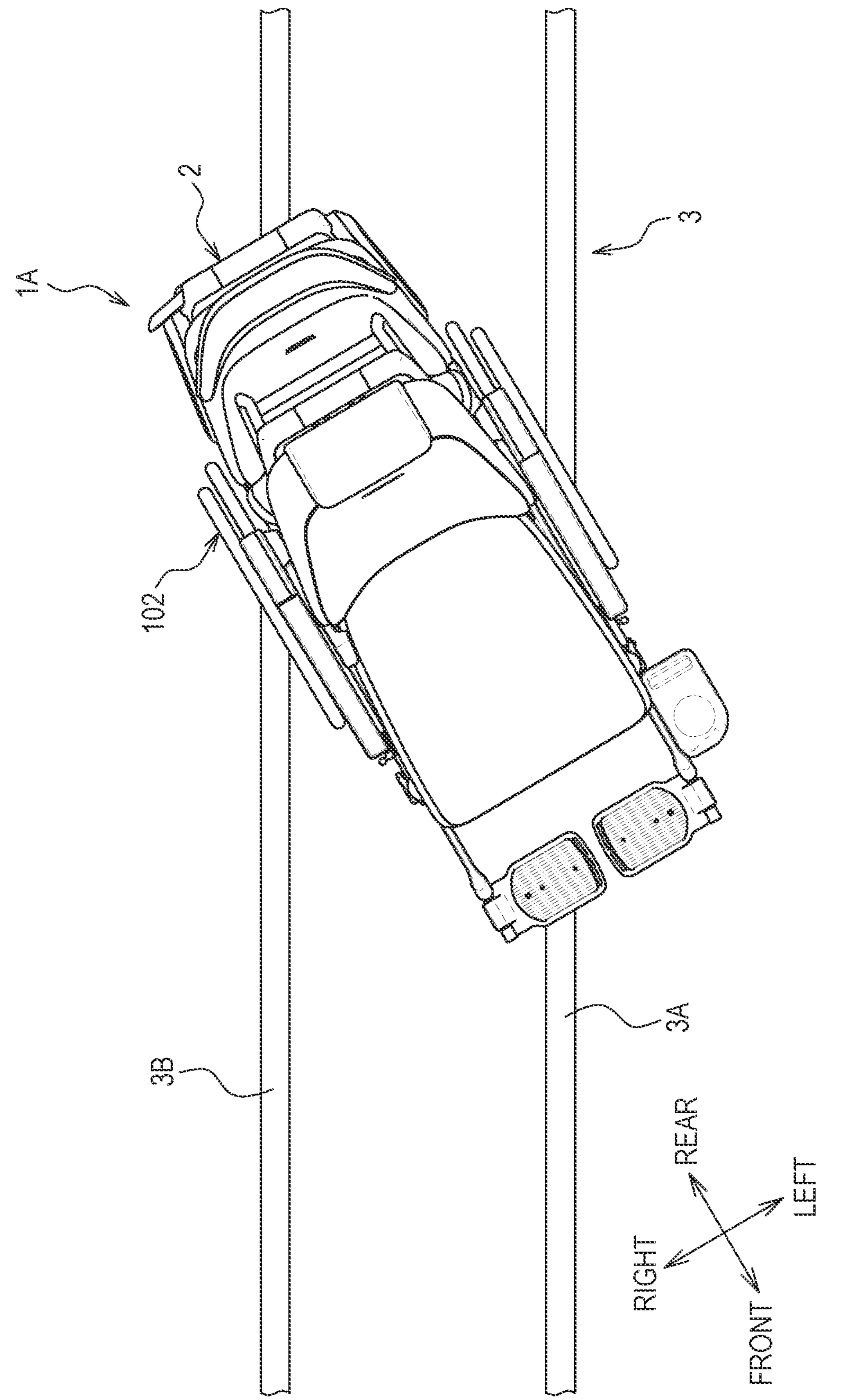
FIG. 6 is a schematic plan view of the wheelchair restraint apparatus in FIG. 5.

A rotation of the upper portion 51 with respect to the lower portion 52 causes the vehicle seat 2 to rotate with respect to the slide mechanism 3 and the floor surface of the vehicle. As shown in FIG. 6, the rotation mechanism 5 causes the vehicle seat 2 to change its orientation such that the front-rear directions of the vehicle seat 2 intersects the sliding directions of the slide mechanism 3 (that is, the directions of extension of the first rail 3A and the second rail 3B). In addition, the vehicle seat 2 can slide while being oriented such that its front-rear directions are intersecting the sliding directions.

The vehicle seat 2 is rotatable in both an occupied state (that is, a state where a person is seated in the vehicle seat 2) and a state where the wheelchair 102 is restrained. Thus, the wheelchair 102 can be restrained to the vehicle seat 2 after the vehicle seat 2 is rotated to be oriented such that the wheelchair 102 is easily restrained, and then the vehicle seat 2 and the wheelchair 102 can be rotated to any desirable orientation.

[2-2. Effect]

According to the embodiment that has been explained above in detail, the following effect can be obtained.

(2a) The insertion direction of the wheelchair 102 to the vehicle seat 2 can be adjusted. This further facilitates the adjustment of the restraining position of the wheelchair 102 in the vehicle.

3. Other Embodiments

An embodiment of the present disclosure has been explained above. Nevertheless, the present disclosure can be carried out in various modifications without being limited to the aforementioned embodiments.

(3a) In the wheelchair restraint apparatus of the aforementioned embodiments, the restraint mechanism of the vehicle seat and the configuration of the insertion portion of the wheelchair are merely examples. For example, the insertion portion may also be fixed to the restraint mechanism by a structure other than a latch.

(3b) In the wheelchair restraint apparatus of the aforementioned embodiments, the main body to which the wheelchair is restrained does not necessarily have to be the vehicle seat. For example, the main body may be a structure or component other than the vehicle seat, such as a wall and a frame body installed in the vehicle. In this case, such structure or component that serves as the main body of the wheelchair restraint apparatus has a seat belt installed and is attached to the slide mechanism.

(3c) Functions of one element in the aforementioned embodiments may be achieved by two or more elements. Functions of two or more elements may be integrated into one element. A part of the configuration in the aforementioned embodiments may be omitted. At least a part of the configuration in the aforementioned embodiments may be added to or replaced with other part of the configuration in the aforementioned embodiments. It should be noted that any and all modes included in the technical ideas that are identified by the languages recited in the claims are embodiments of the present disclosure.

What is claimed is:

1. A wheelchair restraint apparatus configured to restrain a wheelchair inside a vehicle, the apparatus comprising:

a main body comprising:

a seat belt, and a restraint mechanism to and from which the wheelchair is attachable and detachable; and a slide mechanism configured to cause the main body to slide with respect to the vehicle, wherein the restraint mechanism is configured to restrain the wheelchair in a state where a part of the wheelchair is inserted to the restraint mechanism in a traveling direction of the wheelchair, and wherein the restraint mechanism includes at least one striker, wherein the at least one striker includes a rod that extends vertically, and wherein the rod is configured to be retained within a retaining space of at least one latch mechanism of the wheelchair.

2. The wheelchair restraint apparatus according to claim 1, further comprising a rotation mechanism configured to cause the main body to rotate with respect to the vehicle.

3. The wheelchair restraint apparatus according to claim 1, wherein the main body is a vehicle seat.

* * * * *